April 17, 1945.  W. M. EMERY  2,373,666
IMPACT CLUTCH
Filed Nov. 27, 1941    2 Sheets-Sheet 1
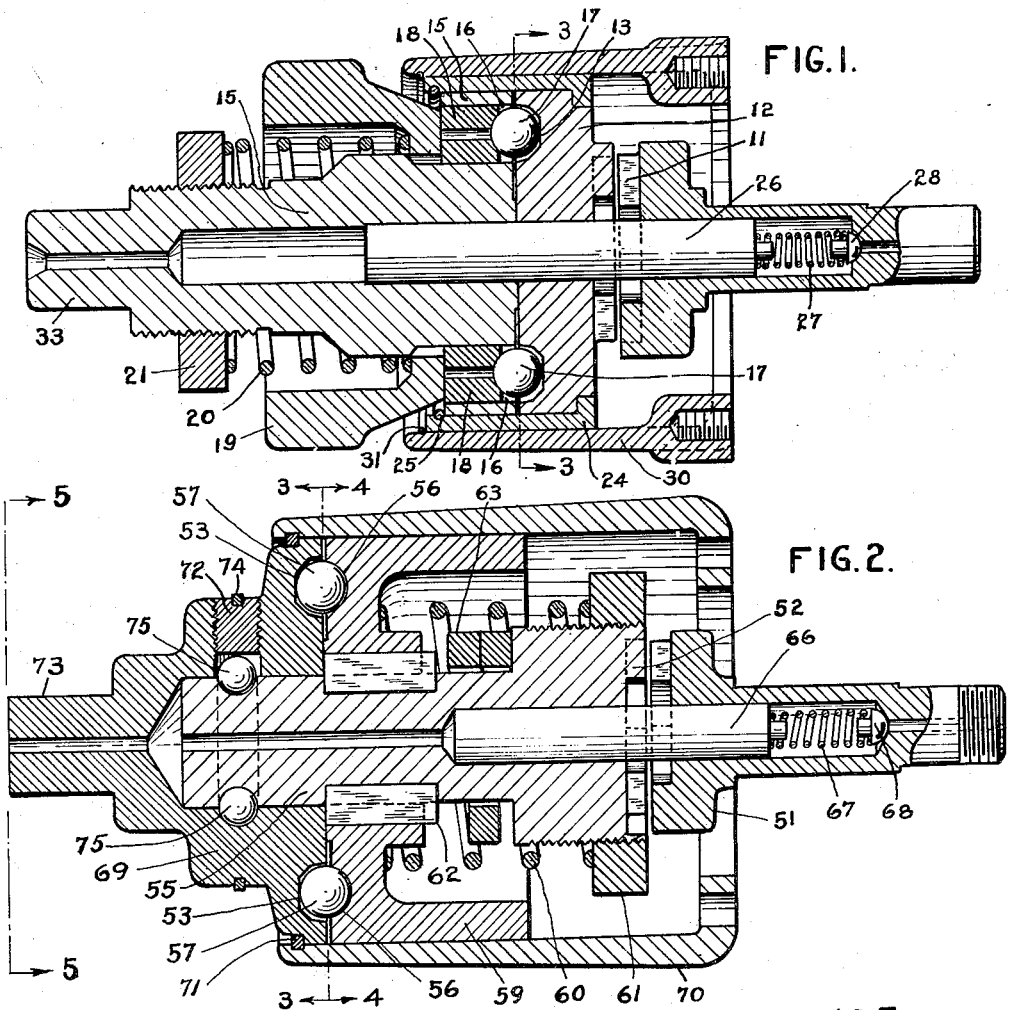
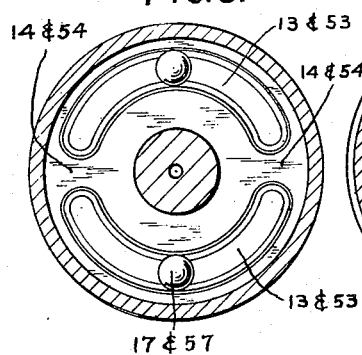
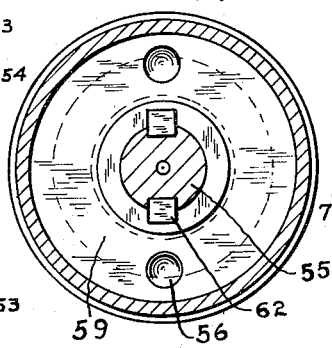
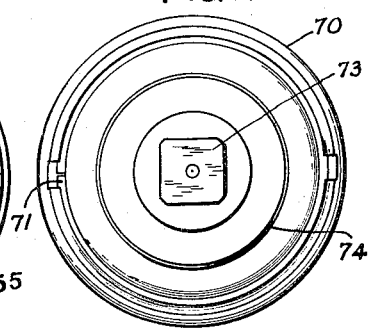
INVENTOR.
William M Emery

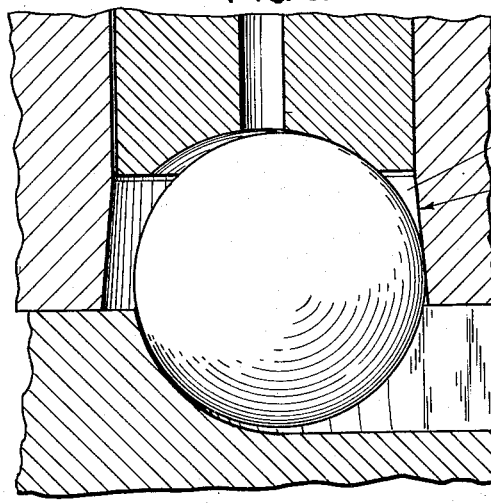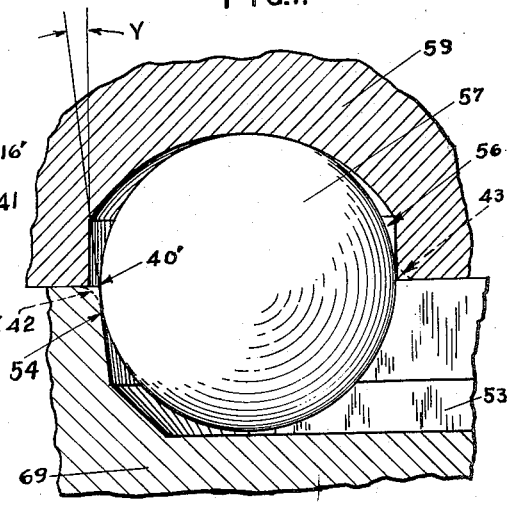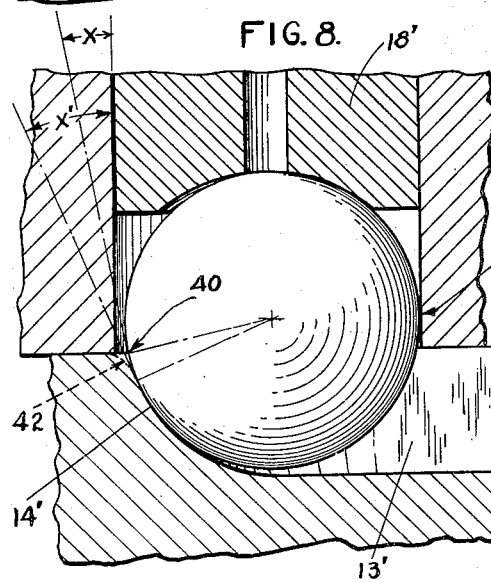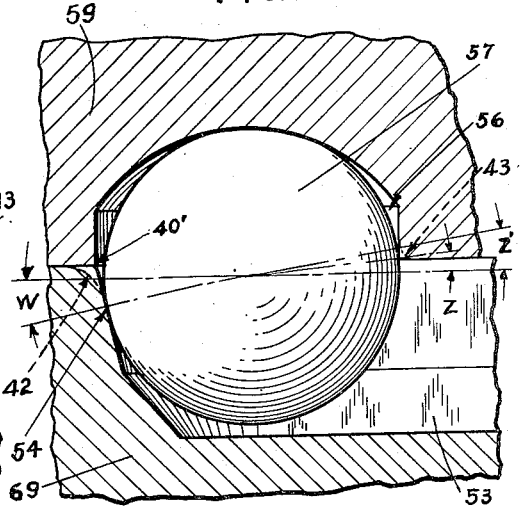

Patented Apr. 17, 1945

2,373,666

UNITED STATES PATENT OFFICE 2,373,666

IMPACT CLUTCH

William M. Emery, Shaker Heights, Ohio, assignor to The Rotor Tool Company, a corporation of Ohio Application November 27, 1941, Serial No. 420,632

11 Claims. (Cl. 192—30.5)

This invention relates to nut setters, stud setters, power screw drivers and the like, where it is desirable to augment the normal torque of the motor by the use of impact or forces incident to a sudden reduction of momentum. Customarily, it is applied to portable rotary tools powered electrically or pneumatically, similar to drills and also to non-portable spindle machine tools and flexible shaft tools.

One object of my invention is to provide a tool which utilizes heretofore unused types of forces and to accentuate their effectiveness by the novel design of related parts, thereby effecting surprising efficiency therefrom.

For example, in clutches now on the market similar to those shown in the patent of Niedhammer 1,657,274 and Levedahl 1,757,125, in order to obtain the result claimed for tools using these clutches by their respective manufacturers, the disengagement of the clutch must be restricted by such a heavy spring that the torque of the motor customarily furnished with the clutch is insufficient by itself to effect the disengagement of the clutch. This results in the stalling of the motor in many applications. If the motor is sufficiently geared down to prevent this, the speed of the work is objectionably reduced and a heavy reactive torque results which is dangerous and very annoying to the operator. By substituting inertia as a resisting force for the force of the spring, I have overcome this condition and this makes possible operation at higher speeds without stalling and the utilization of the full power output of the motor without stalling, materially increasing the range and the efficiency of the tool. From the accompanying specification and explanation it will be seen I have accomplished an object of providing a tool operable by a motor of less torque and higher speed without the usual tendency to stall when used on work of so resilient a nature, that little sudden impact is effected on account of the gradual rather than sudden setting of the parts, such as compressing springs or running down very tight threads. Another object is to provide a tool of materially greater power and effectiveness without much increase in weight. Other objects are to provide an impact nut setter with easy adjustability which will set nuts and the like thru a wide range of sizes, and to provide an impact clutch which is less susceptible to wear with its attendant loss of power, and to provide a clutching means disengageable with less friction, thereby permitting a steeper and more effective cam angle of disengagement.

Further objects and novel features of the construction will be apparent from the following specifications when considered together with the accompanying drawings, in which:

Fig 1 is a sectional view of an impact clutch embodying my invention cut on the longitudinal axis.

Fig. 2 is a sectional view cut on the longitudinal axis of another impact clutch embodying my invention, somewhat similar to that shown in Fig. 1 but with a rearrangement of parts.

Fig. 3 is a sectional end view of ball races suitable for use with the impact clutches shown in Figs. 1 or 2, cut on line 3—3 of Figs. 1 and 2, exclusive of the balls, with the outer housing of Fig. 1 omitted.

Fig. 4 is a sectional view cut on line 4—4 of Fig. 2.

Fig. 5 is an end view as indicated by line 5—5 in Fig. 2.

Figs. 6, 7, 8 and 9 are enlarged fragmentary, sectional views showing various impact balls and sockets and their angular characteristics and angles enlarged for the sake of clearness, cut on the annular center line of the races.

Shown in Fig. 1 is a dog clutch driver member 11, driven by an electric, fluid, or pneumatic motor or mechanical means (not shown) and engageable by axial movement relative to its mating driven part 12. On the side of 12 opposite to the mating dog clutch teeth are ball races 13 with interruptions 14, shown in greater detail in Fig. 3. Adjacent to 12 is the work spindle 15 which has in its adjacent flanged end two holes 16 which line up with the races 13. Two balls 17 and cylindrical followers 18 are operable in holes 16. Adjacent to the ends of the followers is an inertia follower 19 which is designed to possess a substantial mass effective axially and also flywheel action effective, of course, rotationally. Spring 20 presses the inertia follower 19 against the cylindrical followers 18 or the flanged end of the work spindle 15 to keep the balls normally engaged in the races 13. A nut 21, threaded on the work spindle 15 adjustably compresses the spring 20. Conventional locking means are provided, but not shown, for holding the nut 21 in its selected position. The end of work spindle 15 is squared at 33 to provide for the driving of a conventional nut socket similar to 73 in Fig. 5. Other conventional means may be used for attaching thereto suitable drivers for studs, screws and the like which are not part of this invention.

A flanged sleeve 24 with its retaining ring 25 holds the work spindle 15 and the dog clutch and race member 12 in close axial relationship. An axial pin 26 extends thru the work spindle 15 and the clutch members 12 and 11 to keep them in alignment. A spring 27, with a hardened button 28 mounted in one end, presses into an axial socket of the dog clutch driving member 11 to normally cause a separation of the dog clutch members 11 and 12.

A housing 30 is fixedly attached at any suitable point to the non-rotating part or frame of the driving means (not shown). Sleeve 24 is loosely journaled in housing 30 to allow both rotational and limited axial movement. A retaining ring 31 is seated in one end of housing 30 to limit the axial movement of the clutch parts under the action of spring 27.

Shown in Fig. 2 is a somewhat similar clutch with some of the parts transposed. Similarly functioning parts are frequently indicated by the addition of 40 to the numerical designations of parts shown on Fig. 1. A driver dog clutch member 51, driven by a motor (not shown) with or without gearing (not shown) is engageable by axial movement relative to its mating driven part 52, which is an integral part of spindle 55. Keyed to spindle 55 by keys 62 is an inertia follower member 59, which is designed to possess a substantial mass effective axially and also flywheel action effective, of course, rotationally. In one face of the inertia follower 59 are two sockets 56 for balls 57 about one-half the depth of the diameter of the balls. The peculiar shaping of the sockets are hereafter described in detail and shown in Figs. 7 and 9. Thrusting the inertia follower 59 axially is a compression spring 60, the tension of which is adjustable by nut 61 which may be locked in any selected position by conventional means (not shown). The exterior of the clutch member 52, as well as part of the body of spindle 55 is threaded to receive nut 61 to allow for the change of spring 60 without extensive disassembly of the clutch. Between a shoulder on the spindle 55 and the hub of the inertia follower 59 is a resilient body 63 which in this case is single coil of flat spring wire, although hard fibre and other means might be equally effective. This resilient body is not effective until the inertia follower has moved a distance equal to one-half the ball diameter and can be used to absorb the final recoil forces of the follower.

The balls 57 operate in races 53, with interruptions 54, in head 69, the peculiar shaping of the races 53 is shown in Figs. 3, 7 and 9, and hereafter described in detail. Head 69 is axially fixed and rotably mounted on spindle 55 by balls 75 assembled by removing plug 72 in race grooves cut in the head 69 and spindle 55. Plug 72 is locked in position by retainer ring 74. The end of head 69 is squared at 73 to receive a nut socket (not shown), but any conventional means may be used for this purpose or for driving screws, studs, or other work.

An axial pin 66 extends thru the spindle 55 and the clutch member 51 to keep them in alignment. A spring 67 with a hardened button 68 mounted in the end thereof presses into a socket in the dog clutch member 51 to normally cause a separation of the dog clutch members 51 and 52.

A housing 70 is fixedly attached to the frame or other non-rotating part of the driving motor (not shown). Head 69 and inertia follower 59 are loosely journaled therein to allow both rotary motion and limited axial movement. A retaining ring 71 is seated in one end of the housing 70 to limit the axial movement of the clutch parts under the action of spring 67 and to provide easy disassembly. Grease is retained in the hood and permeates all parts including the clutch ball races through holes (not shown) in the inertia follower 59.

Figs. 3, 7 and 9 show the interrupted races 13 and 53 which are of unique design, differing in important features from the conventional design. Formerly these races such as are shown in Fig. 8 were cut with a spherical milling cutter to a certain depth such as 40% of the ball diameter. The milling cutter had to be slightly larger than the balls in practice to provide clearances for minor inaccuracies of machining. If the cylindrical followers 18' were identical in length and held the balls down to the bottom of the races then the throwout cam action of the races against the balls would be the angle whose sine was .20 or about 12°. See angle X Fig. 8. Allowance must then be made for the clearance of the cutter which would increase the angle X. As wear tended to round the edges 40 of the race 13' at the interruptions 14' as suggested by the broken line 42 Fig. 8, this angle would rapidly increase so that if the wear was 1/32 with a 1/16" ball, the angle X would change from 12° to 16°. Wear of 1/32 inch is not unusual. See X' Fig. 8. This resulted in a material loss of power of the tool and necessitated a constant resetting of the spring tension to compensate for the change of angle until, as frequently happened, the spring could be stressed no further. Since these tools are usually used on high production assembly lines, the time lost in frequent resetting or adjusting represents a complete stoppage of the assembly lines and is a serious problem.

In my new design as shown in Fig. 7 the race depth is approximately 50% of the ball diameter cut with a tapered end mill so that the groove sides and ends are conical instead of spherical. In this way the throwout or cam angle is constant even with wear for a considerable time, such as suggested by the broken line 42 Fig. 7. Also the angle is constant even though all the balls are not fully and equally depressed into the races by the followers.

In the old style races shown in Fig. 8, while the wear at 40 suggested by the broken line 42 was rapid, the wear at 43 Fig. 8 was imperceptible because although the impact force was the same at both 42 and 43 it was not against an edge as at 40 but against a substantially cylindrical surface. Also the wear 42 at 40 was due in part to the rolling of the ball over the edge 40 against a relatively heavy and constant spring pressure. In my invention the spring force has been greatly reduced by the substitution of inertia, hereafter described more fully. By referring to Figs. 7 and 9 it will be seen that with a race cut with truncated conical walls that at the instant that the inertia followers 19 and 59 are initially accelerated which is the instant of greatest impact, the balls are contacting a substantially cylindrical or truncated conical surface similar to 43 Fig. 8 which showed no perceptible wear and by the time the balls 57 or 17 roll over the edge 40 in Fig. 7 the effect of the resisting inertia has been materially reduced in intensity and also the force of spring 20 or 60 is still much less than was formerly necessary because of the substitution of inertia therefor hereafter more fully explained.

The ball sockets 56 are similarly unique in that they are cut with an endmill to form an integral socket with straight sides and a spherical bottom, the radius of which is larger than the ball. In this way the ball always contacts laterally with straight sides and the seat taking the thrust wear sufficiently coincides with the ball radius to produce a long wearing surface and minimum friction.

However, I do not claim total elimination of wear, because ultimately wear will occur. Fig. 7 shows a ball recessed into the race 69 approximately half of its diameter. Fig. 9 shows the ball recessed definitely more than half of its diameter. As the ball is recessed deeper into the races the amount of cylindrical or conical land between the point of initial impact contact and the edge 40' is increased providing more capacity for wear without effecting the initial throwout angle Y in Fig. 7. In Fig. 9, the throwout angle is equal to angle W minus angle Z. Now if with excessive usage wear appears at 42, simultaneously some wear will appear at 43. Since there is no rolling action over the edge at 43 but there is at 40' the latter will wear the faster but the former wear at 43 will help compensate for it to maintain a more constant throwout angle. As wear occurs at 43, the ball 57 will tend to roll to one side in its socket over the concave bottom of the socket 56 thereby depressing the ball 57 further into the race 53. This will be a further compensation for the possible wear at 40'. Also the ball tending to roll back over the concave bottom of socket 56 will compensate for gradual wear of the ball in its socket 56.

Through field experience it will be possible to ascertain the depth that balls should be recessed in the races to secure the most effective balance of wear to maintain most constantly the equivalent throwout angle by following the teaching herein set forth.

Fig. 6 shows an alternate construction wherein the holes 16' are initially conical. This tends to reduce the effective throwout angle of the ball race. When acute throwout angles are desired in the race alone, such as shown in Fig. 8, the edge 40 over which the ball finally rolls becomes too sharp to resist wear. By tapering the ball hole 16' as indicated by 41 in Fig. 6 the race edge can be less acute and so be more durable and still maintain a substantial throwout angle. In Figs. 7 and 8, Y and X represent the respective throwout angles.

The general operation of the two clutches shown are similar. The dog clutch member 11 or 51 is driven by a motor (not shown) at full speed which may be anywhere from 150 R. P. M. to 2000 R. P. M. or higher. Since the forces of impact tend to vary as the square of the speed of the suddenly retarded parts the designing of a clutch capable of high speed operation is of double importance since it both reduces the time and ease of operation and increases the effectiveness of the tool materially. The limiting factors of speed are lubrication of the clutch parts, minimum friction during impact and during the period of free turning, and the amount of torque necessary to separate the clutch drive without stalling in certain cases.

The nut socket (not shown) or other device is attached to the squared end 33 or 73 and engaged on the nut to be set. Axial pressure by the operator causes the dog clutch 11 and 12 or 51 and 52 to engage and the entire clutch picks up the speed of the driver 11 or 57. When the nut is screwed down to the point of setting or any intermediate tight spot, the balls 17 or 57 in an effort to pass the interruptions 14 or 54 of the races throw or accelerate the inertia followers 18 and 19, or 59 axially and rather violently.

The light pressure of spring 20 or 60 reseats the movement of the follower or followers. Its important function is to return the clutch into engagement especially when this must be done against gravity. When gravity is in the proper direction to cause reengagement of the clutch parts the clutch is operable without the spring. Another function of the spring is to provide enough resistance to predetermine the amount of torque transmittable thru the clutch before the clutch parts begin to separate. This amount of torque should always be less than the amount transmittable before the stalling load of the motor is reached.

Another function of the springs 20 or 60 is to furnish sufficient additional constant resistance to the inertia resistance of the followers to straight line acceleration, to furnish a means of regulating the final nut or screw tension, other than such regulation as may be obtained by means of changing the mass of the inertia followers 19 or 59. The relationship between the effect of inertia or mass and spring tension seems to be primarily one of addition rather than multiplication.

In the interim, while the inertia followers are being axially accelerated, the revolving parts of the motor and the parts between the motor and the balls 17 and 57 are suddenly retarded or decelerated providing a heavy impact or hammer blow which is communicated to the nut or other work. The mass of the followers 19 and 59 govern the time and the amount of the deceleration. During the period of revolution until the balls 17 or 57 have again arrived at the interruptions 14 or 54 of their races, relative free movement is allowed and usually the revolving parts accelerate substantially to their original speed, before a second impact blow is delivered. Reduction of spring tension resulting from the use of inertia followers hereafter explained materially reduces friction between impact blows and thereby facilitates reacceleration. This continues until the nut is fully set and is frequently called "rapping." Then the axial pressure is released by the operator and the dog clutch members 11 and 12 or 51 and 52 disengage and the tool is removed from the nut.

The two clutches described vary chiefly in the positioning of their masses. In the former clutch shown in Fig. 1 the heavier parts are between the balls 17 and the nut or work and in the latter clutch shown in Fig. 2 the heavier parts are between the motor and the balls 57, and in the latter the inertia and flywheel type follower 59 is keyed to the normally revolving spindle 55 whereas in the former the inertia follower 19 is held only frictionally, although it too could be keyed to its shaft 15 which does not revolve after the first impact.

The field requirements of tools of this character fall into two classes (1) maximum uniformity of work (2) maximum results and minimum weight of tool. The latter design will produce more powerful repeated impact blows so that the uniformity of work will depend largely on the operator being able to apply a uniform number of impact blows, which is more difficult as the speed increases. The first design is not as sensitive in this respect and will produce more uniform results and is usually used with a minimum number of impact blows and with the smaller bolt sizes.

One way my invention advances the art is that with the ball type clutch, less friction occurs between the cam clutch surfaces and accordingly a more acute throwout angle may be used without stalling, because the sine of the throwout angle cannot be less than the total coefficients of friction of the sliding surfaces without locking. However, to utilize this important factor I have devised races previously described which will not be sensitive to wear so this acute angle may be used and maintained. The force of the hammer blow is materially affected by the acuteness of this angle as impact varies inversely with the movement of the parts struck and striking during impact and accordingly a glancing or angular blow is much less effective than a normal perpendicular blow.

Another and most important way my invention materially advances the art is by the utilization of the forces of inertia as a retarding or governing force to disengage the clutch. My inertia followers 19 or 59 must be suddenly accelerated axially before the balls can pass over the interruptions 14 or 54 of the races and during the time interval necessary to accelerate the followers, the revolving parts of the tool are suddenly and substantially retarded.

Now the effectiveness of this use of inertia in proportion to its mass will vary substantially inversely as the square of the sine of the throwout angle such as Y Fig. 7. Since all parts possess mass and inertia and several clutches have axially moving parts under impact the novelty of my invention rests in the combination of follower parts possessing substantial mass and throwout cam angles sufficiently small to produce the surprising novel and material result derived from the square of the sine of the angle and in the proportioning of the parts and the return spring so that inertia becomes a material and indeed dominating factor in the operation of the clutch. For the first time in the history of the art my invention has made knowing and intelligent use of the forces of inertia to retard and resist the disengagement of the clutch when impact forces are transmitted thereby and to retard its re-engaging and has made them a dominating force in the operation of an impact clutch, thereby producing an unexpected and highly beneficial result.

The ball type impact clutch is best suited to operation at acute angles because of its inherently low coefficient of friction, but this type clutch has, I believe, always been used with relatively light followers and greater throwout angles such as 16° to 20°.

This new inertia follower principle is somewhat more effective as the speed increases, because the force required to accelerate a mass varies as the square of the acceleration interval. Also the ball clutch is more suitable to higher speeds than dog clutch types although in some cases the latter can be used.

Heretofore where the axial escapement movement was used in impact clutches, it has depended upon spring action to resist it. Now spring action is a constant force, irrespective of speed or time. Usually the motor torque was insufficient in itself to cause the balls to jump the interruptions when the spring was fully loaded to provide the full rated capacity of the tool and it was necessary to depend on the forces incident to the momentum of the parts to effect the first and repeated impact blows commonly called rapping. The result of this was that when the resiliency of the bolt or the tightness of the thread resulted in a gradual slowing up instead of a sudden impact, the nut setter would stall without the clutch rapping.

Now inertia is a force of entirely different characteristics than spring tension in an application such as nut setters. Whereas spring tension is a constant force, the force required to accelerate a mass, that is to overcome the inertia of the mass, depends entirely upon the time allowed to perform the acceleration and varies inversely as the square of the time. Accordingly I have found that when inertia is used as a major force of retardation instead of spring tension that it is practical to reduce the constant spring tension 60 to 75% or more and still maintain the same or greater results in nut tightness as read with a torque wrench. With the less spring tension, much less motor torque is necessary, to be in itself sufficient to produce repeated hammer blows or rapping without motor stalling. Thus the stalling tendency of the tool is overcome and the clutch may be operated by the same motor with lower gear ratios and less torque incident thereto, that is at higher and more efficient speeds, without stalling when the work is of a more resilient type. Higher speeds are not only more efficient since momentum varies as the square of the speed, but at the lower speeds and high torque it is increasingly difficult for the operator to resist the reactive torque and impact. Workmen have been injured when high torque nut setters have stalled and the tool has gotten away from them.

An illustrative hypothetical example of the effect of inertia might be that if the work spindle was normally driven at 2000 R. P. M. under impact in the interval necessary to accelerate the inertia follower it might slow down to 700 R. P. M. when the bolt and work being set was fairly rigid. If the bolt or work was more resilient so that the clutch must depend largely on torque rather than the momentum of the parts to produce the repeated hammer blows then the R. P. M.'s may be slowed down to 200, indicating a longer time interval for the acceleration of, or a slower acceleration of, the follower—yet without stalling the motor. While the prolongation of the time interval reduces the force of impact, this is somewhat compensated for by the greater reduction from the original speed under impact.

It is noteworthy that my experiments with similar clutches but with those depending principally on spring tension to resist disengagement show that when they stall they stall before the first hammer blow occurs, that is without rapping or any disengagement of the clutch. Whereas when I use an inertia follower and lighter spring, in an extreme case, the clutch will deliver several hammer blows until it gradually slows down and the motor stalls not through the stalling or jamming of the clutch as in the former case, but because of the overloading of the motor and the inability of the motor to pick up sufficient speed between raps. This shows in a practical way that I have accomplished a new and useful result.

I have also been able to reduce the number of raps per revolution from the conventional three raps per revolution with ball impact clutches to two raps by reducing the number of balls and stations thereby reducing the load on the motor at high speeds.

Furthermore with a light spring and still heavier inertia follower at high speeds, the time required for the movement and return of the follower while rapping is such that the balls are not returned in time to engage an interruption until the sequential ball has passed next race interruption, so that instead of two raps per revolution only one rap per revolution is produced with a corresponding reduction in the load on the motor while rapping.

In order to explain as best I can the application of my discoveries as to the beneficial effect of the use of inertia, acute race angles, etc., I have made use of detailed physical explanations and theories relative to the action and effect of certain forces which to the best of my knowledge and belief are correct, but I do not necessarily predicate or limit my invention to or upon their accuracy but rather to the practical and surprising results accruing from my structure.

Accordingly, I claim the discovery and reduction to practice of a new principle of construction in impact clutches of the type described capable of broad application and more specifically what I claim as my invention includes:

1. In a tool, having an impact clutch, revolving parts, two intermittent engaging clutch members, races in one member, having acute conical contact surfaces, sockets in the other member, balls interconnecting said sockets and races, adjustable resilient means to predetermine the amount of torque transmittable thru the engaging clutch members before they begin to separate, and substantial mass means disposed to provide substantial flywheel action and also substantial inertia forces resistant to acceleration in an axial direction which must be so accelerated thru the conversion of forces of momentum of the revolving parts by the acute conical race surfaces and the balls before the engaging clutch members are completely disengaged, disposed to materially delay said complete separation until substantial deceleration of the revolving parts has taken place.

2. In an impact clutch, the combination of a circular ball race and an interruption therein, the end surfaces of said race being substantially those of a truncated cone.

3. In an impact clutch, having ball races, interruptions therein, balls to operate in said races, and sockets for said balls having integrally substantially cylindrical walls and a spherically concave end having a radius slightly larger than the ball.

4. In an impact clutch, a shaft, a work driving clutch member journaled thereto with a thrust and radial bearing, a second clutch part operatively associated with the first clutch member disengageable therefrom by an axial movement, and keyed to said shaft, resilient means to resist said axial movement, a third clutch member attached to said shaft to drive it, and a nut assemblable over the periphery of said third clutch member to adjustably compress said spring.

5. In an impact clutch, the combination of a revolving driver member and a driven member, a ball race in one of said members, a plurality of interruptions therein, a similarly spaced plurality of ball sockets in the other member, balls in said sockets, said race interruptions and ball sockets and their attendant members being arranged to permit a plurality of impact blows at a plurality of positions in each revolution, resilient means to normally press said balls into said races, an inertia mass member mounted for axial movement on one of said members operatively interposed between said balls and said resilient means, the mass of said inertia member in relationship to the resistance of the resilient member and the speed of said driven member and the throwout angle of said ball race being such as to cause said inertia mass member to be accelerated against said resilient member so that the said resilient member will not return the weight member to its original position until at least one of said positions has been skipped.

6. In an intermittent disengageable clutch, in combination with a ball, a socket, a ball race, an interruption therein having a throwout angle to effect a resultant force acting to move the ball into the socket to clear the interruption and to disengage the clutch, said throwout angle being in excess of the required angle thus effecting longer life for said interrupted race and less variation of said throwout angle incident to wear due to the ball rolling over the edge of said interruption, resilient means tending to resist said force and to press the ball into the race and to allow its release at a predetermined load, of, a side wall for the socket tapered in a direction tending to resist said force thereby compensating for the excess throwout angle of the interruption while retaining said increased life and longer transmission of predetermined loads without clutch adjustments.

7. In combination, a rotatable driving member, a driven member substantially co-axial therewith, and clutch means for interconnecting said members, said clutch means comprising axially movable means and cam means engaged thereby, said cam means axially moving said movable means in one direction to effect disengagement of said members, resilient means for urging the axially movable means in the opposite direction to effect a clutching engagement for transmitting torque between said members, said axially movable means including mass means for momentarily opposing the sudden movement of said axially movable means in said one direction to effect a sudden transmission of torque between said members, said resilient means effecting a greater transmission of torque between said members than said mass means when the speed of the axial movement of said movable means in said one direction is below a predetermined value and said mass means effecting a greater transmission of torque than said resilient means above said predetermined value, and means for keying the said mass means to one of said members.

8. In combination, a rotatable driving member, a driven member substantially co-axial therewith, and clutch means for interconnecting said members, said clutch means comprising at least a cam surface portion on one of said members and an axially movable engageable element carried by the other member and adapted to engage the said cam surface portion, said cam surface axially moving said element in one direction to effect disengagement of said members, resilient means for urging the said element in the opposite direction to effect a clutching engagement for transmitting torque between said members, mass means axially movable with said element for momentarily opposing the sudden movement of said element in said one direction to effect a sudden transmission of torque between said members, said resilient means effecting a greater transmission of torque between said members than said mass means when the speed of the axial movement of said element in said one direction is below a predetermined value and said mass means effecting a greater transmission of torque than said resilient means above said predetermined value.

9. In combination, a rotatable driving member, a driven member substantially co-axial therewith, and clutch means for interconnecting said members, said clutch means comprising at least a cam surface portion on one of said members and an engageable element carried by the other member and adapted to engage the said cam surface portion, said engageable element being axially movable in said other member and riding over the said cam surface to disengage the said members under torque transmitting conditions, resilient means urging the engageable element toward the cam surface and opposing said disengaging axial movement of the engageable element riding over the cam surface to effect a transmission of torque between said members, and axially movable mass means axially movable with the engageable element for momentarily opposing the axial disengaging movement of the engageable element to effect a sudden transmission of torque between said members, said resilient means effecting a greater transmission of torque between the said member than the said mass means when the speed of the axial disengaging movement of said engageable element is below a predetermined value, and said mass means effecting a greater transmission of torque than said resilient means above said predetermined value.

10. In combination, a rotatable driving member, a driven member substantially co-axial therewith, and a clutch for interconnecting said members, said clutch comprising driving and driven elements and axially movable clutch means therebetween, axially movable mass means movable with said clutch means, one of said elements comprising cam means for camming said clutch means and said mass means in one direction to disengage said clutch, resilient means for urging the axially movable mass means and the clutch means in the opposite direction to effect a clutching engagement for transmitting torque between said members, said mass means momentarily opposing the sudden movement of said clutch means, said mass means opposing the axial movement of the clutch means incident to sudden changes in the axial speed thereof with a force greater than the force of the resilient means when said changes in the axial speed are above a predetermined value and opposing said axial movement with a force less than that of the resilient means for changes in axial speeds below said predetermined value.

11. In combination, a rotatable driving member, a driven member substantially co-axial therewith, and a clutch for interconnecting said members, said clutch comprising driving and driven elements and axially movable clutch means therebetween, axially movable mass means movable with said clutch means, one of said elements comprising cam means for camming said clutch means and said mass means in one direction to disengage said clutch, resilient means for urging the axially movable mass means and the clutch means in the opposite direction to effect a clutching engagement for transmitting torque between said members, said mass means momentarily opposing the sudden movement of said clutch means, said mass means opposing the axial movement of the clutch means incident to sudden changes in the axial speed thereof with a force greater than the force of the resilient means when said changes in the axial speed are above a predetermined value and opposing said axial movement with a force less than that of the resilient means for changes in axial speeds below said predetermined value, said resilient means effecting a torque less than that required to stall the motor.

WILLIAM M. EMERY.